Feb. 3, 1931.        N. E. BRAY        1,790,969
TIDE AND CURRENT MOTOR
Filed April 2, 1929    3 Sheets-Sheet 1
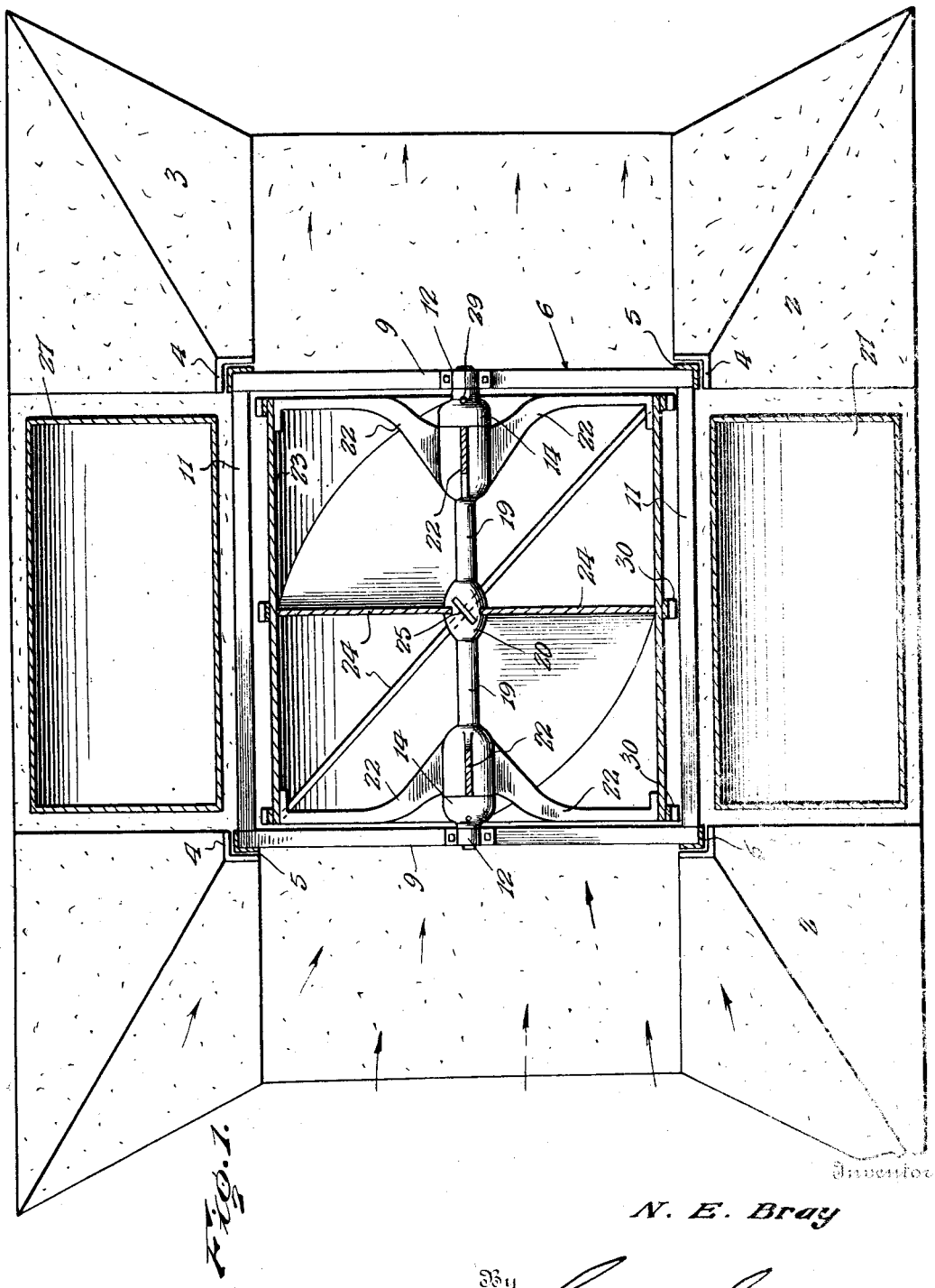
N. E. Bray
By Lacey & Lacey, Attorneys

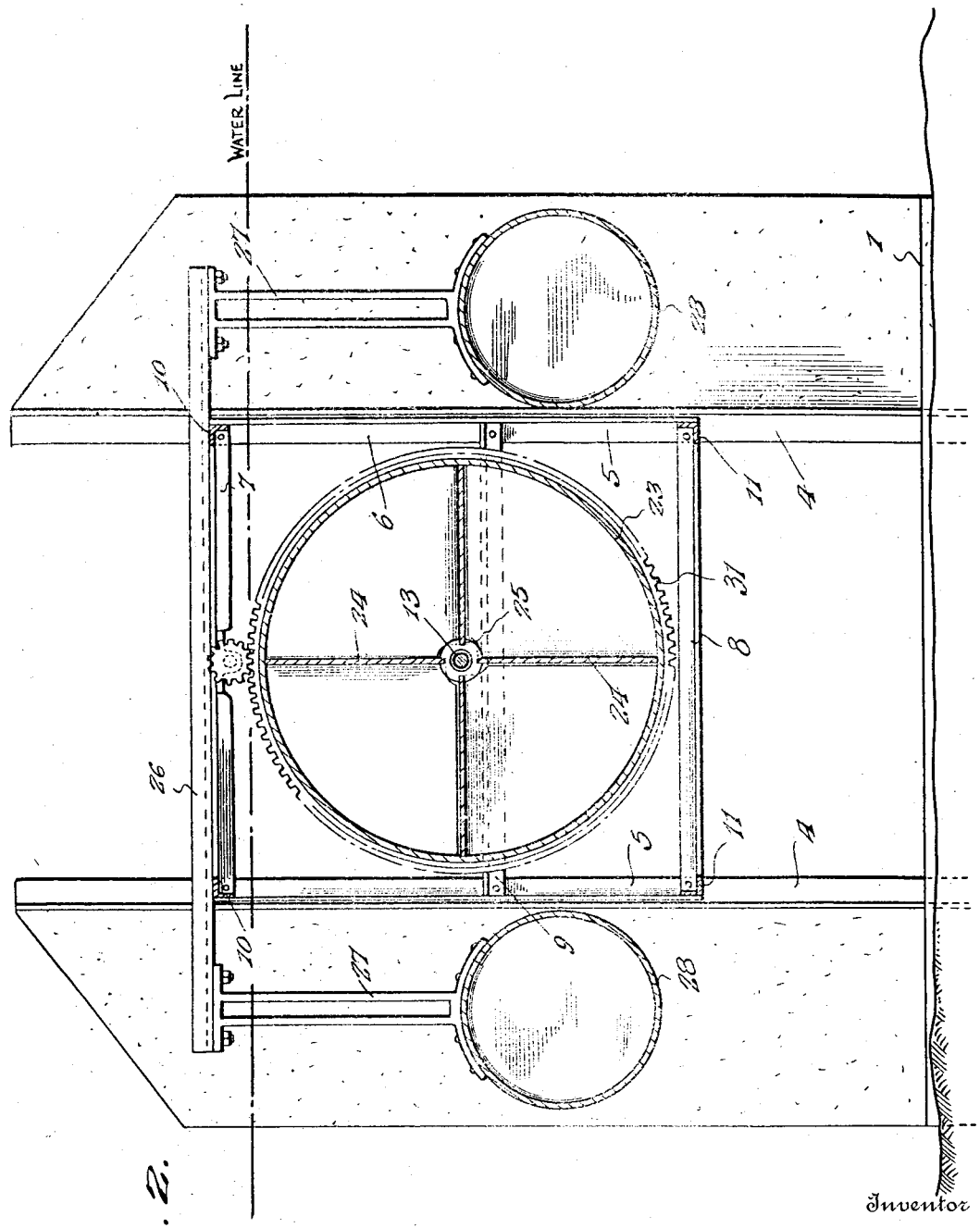

Feb. 3, 1931.     N. E. BRAY     1,790,969
TIDE AND CURRENT MOTOR
Filed April 2, 1929     3 Sheets-Sheet 3
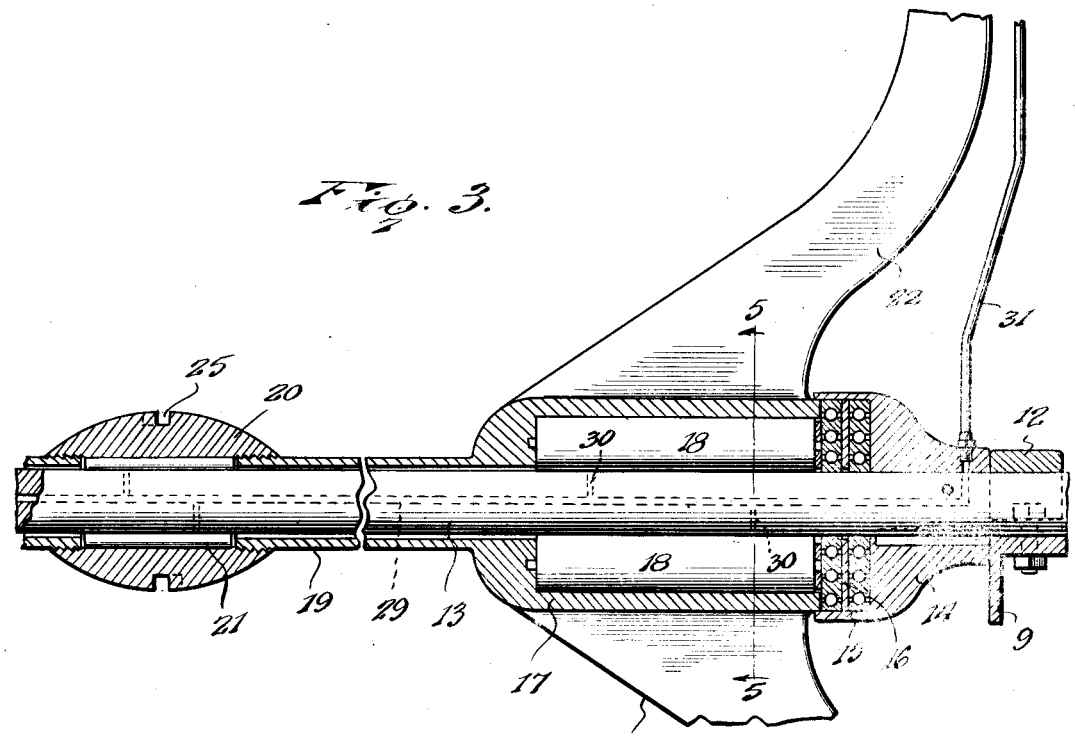
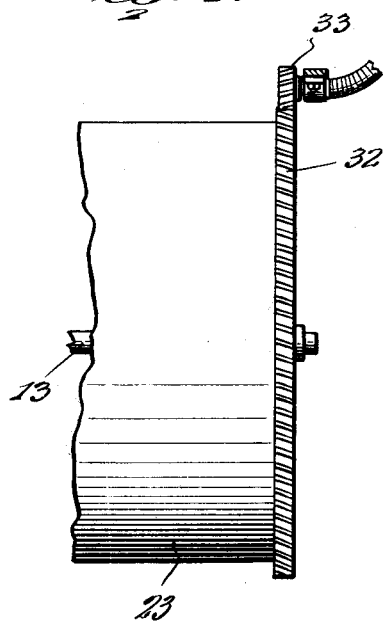
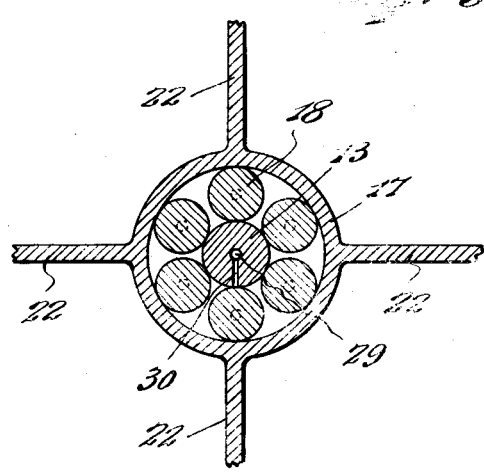
N. E. Bray.

Patented Feb. 3, 1931

1,790,969

UNITED STATES PATENT OFFICE

NORRIS E. BRAY, OF CONCORD, MASSACHUSETTS

TIDE AND CURRENT MOTOR

Application filed April 2, 1929. Serial No. 351,954.

The present invention is directed to improvements in tide and current motors.

The primary object of the invention is to provide a motor of this character so constructed that the flow of water in a stream or river, or water responsive to the ebb and flow of the tides may be used for supplying power for various purposes.

Another object of the invention is to provide a device of this kind wherein the blade containing casing is capable of rising and falling with the tide in order to maintain the casing at a point wherein the force of the water is greatest.

Another object of the invention is to provide a device of this character including a revolving casing having means upon its periphery for connection with power driving elements.

Another object of the invention is to provide a motor of this kind which is simple in construction, durable, efficient, and one which can be manufactured at a small cost.

With these and other objects in view, this invention resides in the novel features of construction, formation, combination and arrangement of parts to be hereinafter more fully described, claimed and illustrated in the accompanying drawings, in which:

Figure 1 is a horizontal sectional view through the device.

Figure 2 is a vertical sectional view of the device taken transversely thereof.

Figure 3 is a detail sectional view of the shaft and hub mountings.

Figure 4 is a fragmentary elevation of a modification of the drive connection.

Figure 5 is a sectional view on the line 5—5 of Figure 3.

Referring to the drawings, the numeral 1 designates a foundation of concrete from each corner of which rises a buttress 2, each buttress being provided with flared faces 3.

Each buttress is provided with a vertical guide groove 4 for slidably guiding the corner posts 5 of the frame 6. The frame 6 includes upper and lower end bars 7 and 8 and intermediate end bars 9, there being upper and lower side bars 10 and 11, said bars, when properly united, providing a rigid frame.

The intermediate end bars 9 have suitably mounted thereon bearings 12 in which are fixed the ends of the shaft 13, said shaft having keyed to its ends caps 14 in which are formed recesses 15, and confined in said recesses are thrust bearing assemblies 16.

Mounted upon the shaft 13, adjacent each end thereof, are hubs 17 which bear against the adjacent bearings 16, said hubs having roller bearings 18 mounted therein. The hubs are provided with tubular extensions 19 which are connected to the ends of the central hub 20, said extensions and latter hub confining the shaft 13. The hub 20 is provided with roller bearings 21.

The hubs 17 have spokes 22 carried thereby which have their outer ends suitably fixed to the interior wall of the cylindrical casing 23.

The sector-shaped blades 24 are mounted in the casing 23 and have their outer edges curved and suitably fixed to the interior faces of the casing, the straight edges of the blades having their central portions seated in recesses 25 formed in the hub 20. These blades are arranged diagonally within the casing so that the force of the current or tide will be effective through either end of the casing.

A pair of cross bars 26 are fixed to the upper side bars 10 of the frame and have their ends extended beyond the frame, and secured to these extended ends are brackets 27 which support the pontoons or floats 28, said pontoons or floats sustaining the casing properly within the stream or other body of water and occupying the space between the buttresses 2, as more particularly shown in Figure 1 of the drawings.

The shaft 13 is provided with a central passage 29 and branch ducts 30 which discharge into the hubs 17 and 20 in order that lubricant can be supplied thereto. The lubricant is conducted to the passage 29 through a tube 31 which will have its entrance end conveniently located in order that the lubricant can be supplied thereto.

The casing 23 is provided with especially arranged teeth in order that a chain or gear may be connected therewith to transmit power during rotation of the casing for any desired purpose. As shown in Figure 4, the casing is provided with a beveled gear ring 32 which is adapted to mesh with a worm 33 from which the power is obtained for driving any suitable mechanism. It will be observed that by providing the driving element directly upon the periphery of the casing 23, the power thus derived will not only be strong, but will have considerable speed as well.

The construction is such that when used as a tide motor it will operate when the tide is coming in or ebbing and likewise can be placed in a stream to be acted upon by the current thereof. Owing to the presence of the pontoons, the casing will rise and fall with the tide in order that said casing will be maintained at all times in the current at its strongest level.

Furthermore, it will, of course, be understood that the motor may be set at any angle desired, depending upon conditions of installation, so that the full benefit of such installation will be obained.

While I have illustrated the spokes 22 as being cast integral with the hubs 17, I do not wish to be limited to this construction since the spokes may be separable and bolted or clamped in any approved manner to the hubs.

From the foregoing, it is thought that the construction, operation, and many advantages of the herein described invention will be apparent to those skilled in the art, without further description, and it will be understood that various changes in the size, shape, material, proportion, and minor details of construction may be resorted to without departing from the spirit or sacrificing any of the advantages of the invention.

Obviously, the motor can be placed in a flume having gates at each end in order that the flow can be stopped should it be necessary to make repairs.

What is claimed is:

In a current motor, a frame, a fixed shaft on the frame, middle and end hubs loose on the shaft, tubular elements loose on the shaft and connecting the several hubs, a cylindrical casing, spokes between the end hubs and casing, and blades disposed divergently within the casing and having their outer edges curved and attached to the inner wall of the casing, and having their inner edges straight and connected centrally to the middle hub.

In testimony whereof I affix my signature.

NORRIS E. BRAY. [L. S.]